July 5, 1927.
L. DEUTSCH ET AL
1,635,115
APPARATUS FOR CLEANING CONTAINERS AND THE LIKE
Filed Oct. 21, 1925    2 Sheets-Sheet 2
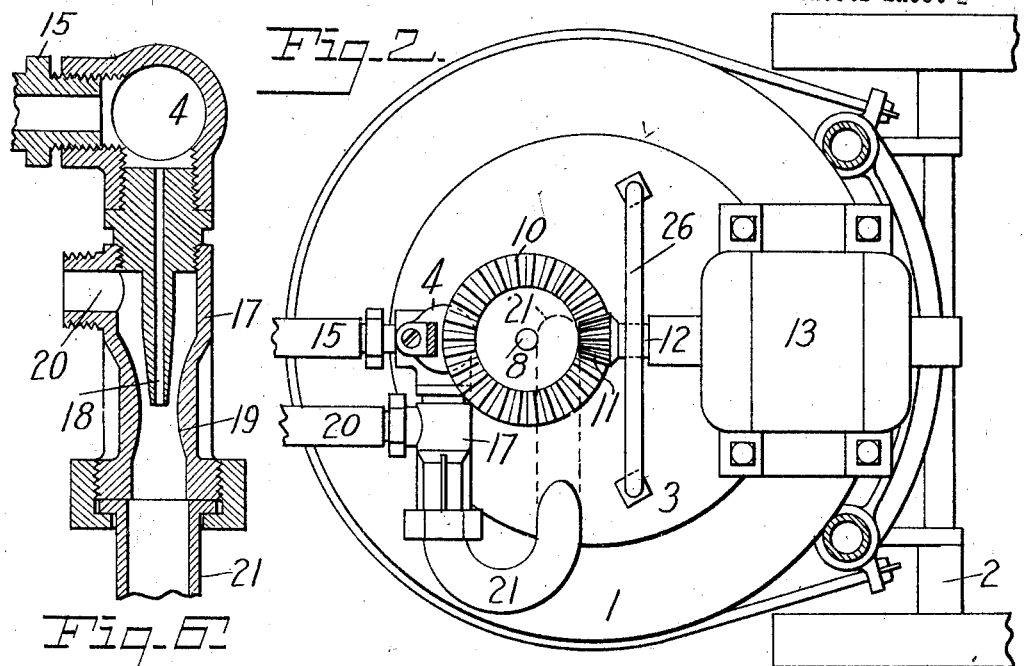
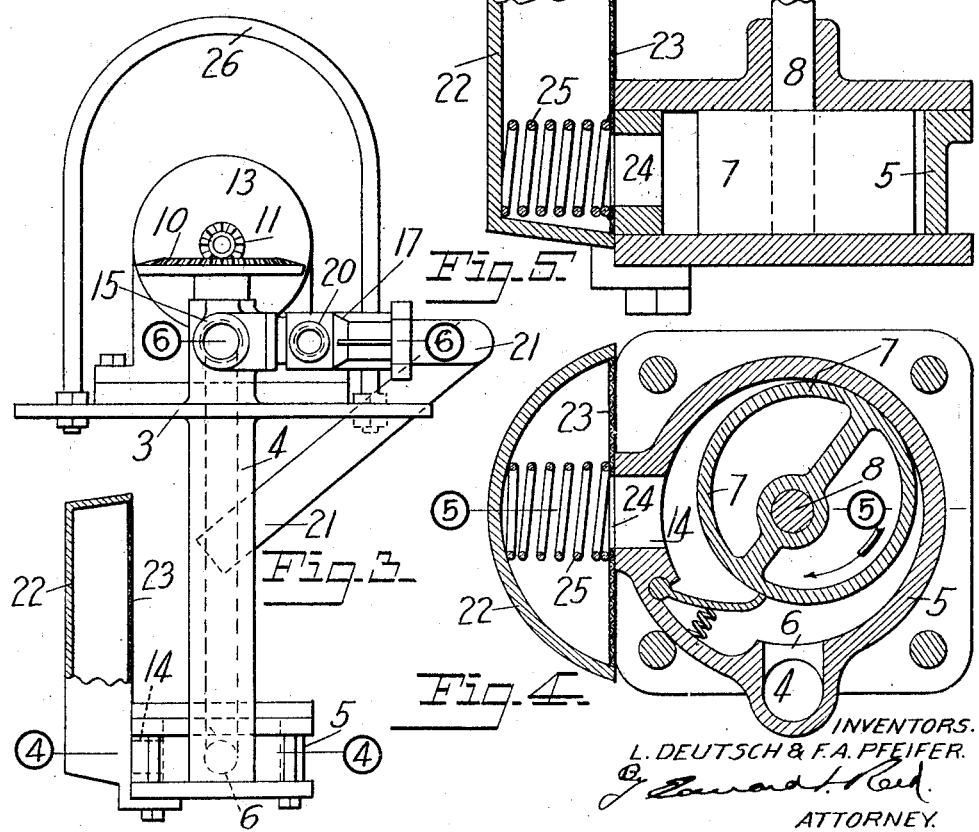
INVENTORS.
L. DEUTSCH & F. A. PFEIFER.
ATTORNEY.

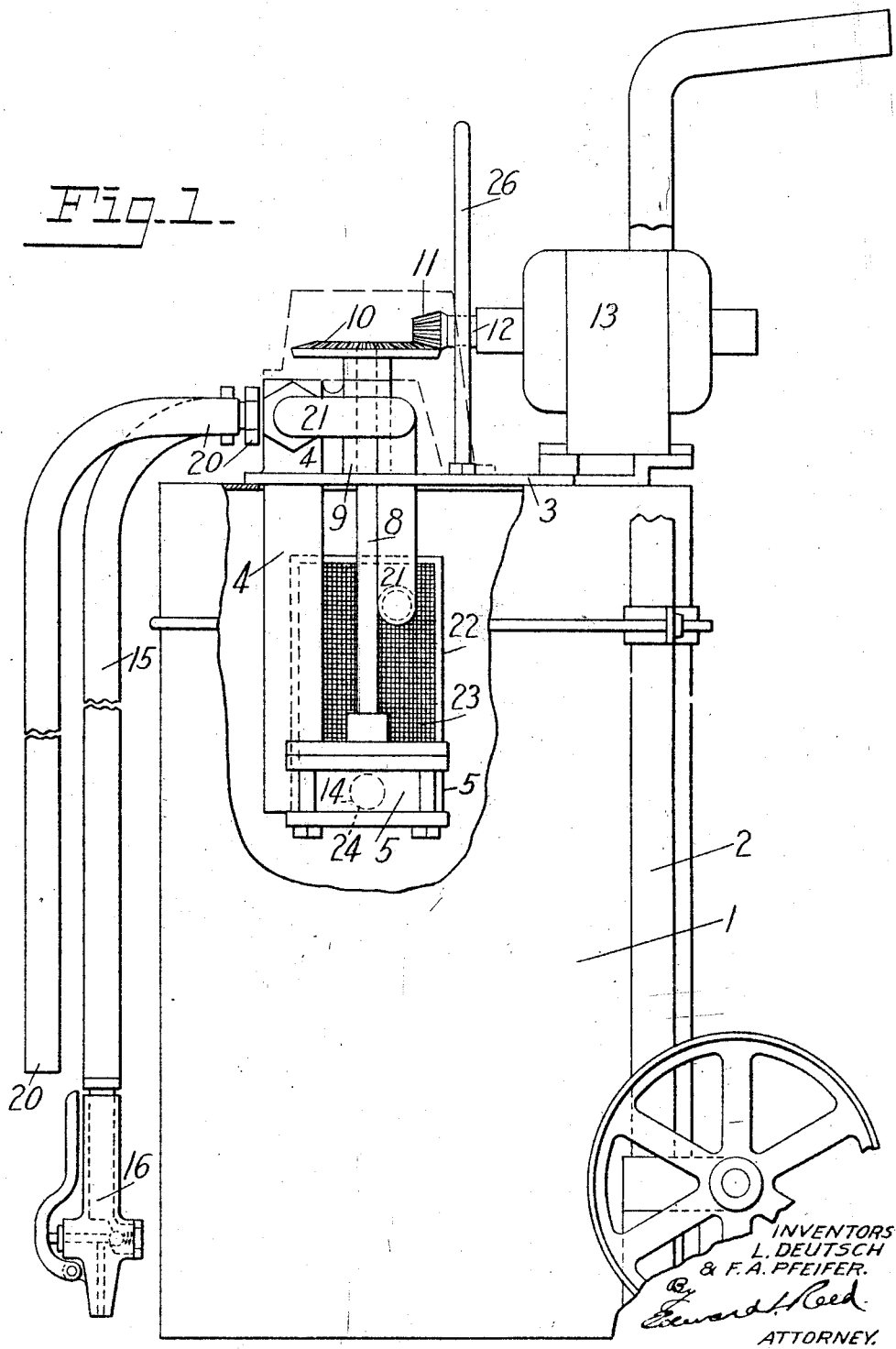

Patented July 5, 1927.

1,635,115

UNITED STATES PATENT OFFICE.

LEO DEUTSCH AND FERDINAND A. PFEIFER, OF SPRINGFIELD, OHIO; SAID PFEIFER ASSIGNOR TO SAID DEUTSCH.

APPARATUS FOR CLEANING CONTAINERS AND THE LIKE.

Application filed October 21, 1925. Serial No. 63,912.

This invention relates to an apparatus for cleaning containers or the like and is designed more particularly for cleaning transmission casings and differential casings of automobiles.

One object of the invention is to provide an apparatus by means of which accumulations of hardened or partially hardened grease may be removed from the walls and the mechanism within the containers through the filling opening or other inlet of the container.

A further object of the invention is to provide such an apparatus by means of which a jet of cleaning fluid may be projected into the container to soften and dislodge the accumulation of material from the walls and mechanism thereof and the liquid and dislodged material withdrawn either simultaneously with the projection of the jet of liquid into the container or separately therefrom.

A further object of the invention is to provide such an apparatus in which the cleaning liquid may be separated from the foreign matter and again injected into the container.

A further object of the invention is to provide such an apparatus which will be simple in its construction and operation, of a simple compact form and which can be produced at a relatively low cost.

Other objects of the invention will appear as the apparatus is described in detail.

In the accompanying drawings Fig. 1 is a side elevation, partly broken away, of an apparatus embodying our invention; Fig. 2 is a top plan view of such an apparatus partly in section; Fig. 3 is a side elevation, partly broken away, of the pump and suction apparatus; Fig. 4 is a section taken on the line 4—4 of Fig. 3; Fig. 5 is a section taken on the line 5—5 of Fig. 4; and Fig. 6 is a longitudinal section through the ejector.

In these drawings we have illustrated one embodiment of our invention and have shown the same as designed more particularly for use in cleaning the transmission casing and differential casing of an automobile but it will be understood that this particular embodiment has been chosen for the purpose of illustration and that the apparatus may take various forms and may be used for various purposes without departing from the spirit of the invention.

In that form here illustrated, the apparatus comprises a tank 1 adapted to contain a suitable cleaning liquid, the character of which will depend largely upon the character of the material to be removed from the container and which, when the apparatus is used for cleaning transmission casings and differential casings may be kerosene. The tank is preferably of such a character that it can readily be transported from one place to another and is here shown as mounted on a hand truck 2. The operating mechanism is supported on the tank and, as here shown, is carried by a plate or base 3 which is mounted on the top wall of the tank and which constitutes a removable cover or closure for the tank. Rigidly secured to this base 3, and preferably formed integral therewith, is a tubular member or conduit 4 which extends into the tank through an opening in the top wall thereof. This tubular member constitutes both a support for a pump and the discharge conduit for that pump. In the present instance, we have employed a rotary pump 5 of a well known type but it will be obvious that a pump of any suitable kind may be used. The casing of the pump is rigidly secured to and, if desired, may be formed integral with the lower end portion of the tubular member or conduit 4 and this conduit communicates with the interior of the pump casing by means of an outlet port 6. Any suitable means may be provided for operating the pump but preferably a motor is used for this purpose and, in the present arrangement of the casing the rotatable member 7 of the pump is rigidly secured to a shaft 8 which extends upwardly through a bearing 9 on the base plate 3 and has secured to its upper end a bevel gear 10 which meshes with a bevel pinion 11 carried by the shaft 12 of a motor 13, which is also preferably mounted on the base 3. The pump is so arranged within the tank 1 that the inlet port 14 of the pump will be immersed in the liquid within the tank so that the pump will draw the liquid from the tank and discharge it through the conduit 4. The conduit is connected at its upper end with a discharge conduit, such as a flexible hose 15 having at its end a suitable nozzle 16 of such a character that the stream of liquid under pressure may be discharged from the nozzle into the container which is to be cleaned and may be directed against all portions of the interior of that container. In the present construction we have employed a valve controlled nozzle so that the flow of the liquid through the same may be controlled by the operator at the nozzle. The conduit 4 is also connected with an ejector 17 having an inlet nozzle 18 of small capacity which discharges into a restricted portion 19 of the ejector. The outlet leading from the conduit 4 to the flexible hose 15 is of a capacity less than the capacity of the conduit 4 and consequently the liquid will be discharged through the ejector nozzle 18 at a relatively high pressure. The ejector 17 has connected therewith in the rear of the discharge end of the nozzle 18 a conduit 20 which is also preferably in the form of a flexible hose and is adapted to be inserted in the container which is being cleaned. The discharge of the jet of liquid under pressure through the ejector will create a suction in the conduit 20 and cause the liquid to be withdrawn from the container, together with the hardened grease or any other foreign matter which may be within the container, and cause the same to be discharged from the ejector through an outlet pipe 21. This outlet pipe 21 may deliver the liquid and other matter withdrawn from the container at any desired point but preferably the liquid is returned to the tank 1 where it is separated from the foreign matter and again taken up by the pump and forced into the container, thus enabling the container to be cleaned by the use of a relatively small quantity of liquid and enabling this same liquid to be used over and over again for cleaning different containers.

In order to separate the liquid from the foreign matter we have separated the inlet port 14 of the pump from the interior of the tank 1 by means of a screen. In the preferred arrangement the pump is provided with an intake chamber, here shown as consisting of a casing 22, approximately semi-circular in cross section, which is supported at its lower end on the casing of the pump. This chamber has a foraminated front wall or screen 23 through which the liquid must enter the same and which is of such a character that heavy oils or solid matter cannot pass into the inlet chamber. The screen preferably extends for the full length of the casing and has at its lower end an opening 24 in line with the inlet 14 of the pump so that the liquid may flow through the inlet chamber to the pump. In order to hold the screen firmly in engagement with the pump casing about the inlet opening 14 we have mounted in the inlet chamber a coil spring 25, one end of which engages the screen and surrounds the opening 24 so as to press this portion of the screen firmly against the wall of the casing. Preferably the spring is soldered or otherwise secured to the screen to hold the same in place. Heavy oils and partially hardened greases would have a tendency to adhere to the screen 23 and thus clog the same so as to prevent the free passage of liquid to the inlet chamber and in order to prevent this clogging of the screen we have so arranged the outlet pipe 21 of the ejector that the liquid will be discharged therefrom directly against the screen 23 and will thus serve to displace and wash off of the screen any oil or grease which may tend to accumulate thereon and in this manner maintain a free passage of liquid through the screen. Preferably the pump and inlet chamber are so arranged with relation to the normal level of the liquid in the tank that the upper portion of the screen, against which the outlet pipe 21 discharges, will lie above the level of the liquid during the cleaning operation, thereby permitting the liquid to be discharged from the outlet pipe directly against the screen.

The operation of the apparatus will be readily understood from the foregoing description and it will be apparent that when a container is to be cleaned the plug or other closure of the filling opening is removed, the suction pipe 20 inserted in the container, the motor started to place the pump in operation and the nozzle 16 manipulated to direct a stream of liquid under pressure against the various parts of the interior of the container. The action of the liquid on the material will tend to soften the same and the impact or force of the jet will dislodge the material and cause it to be precipitated into the liquid which has accumulated in the bottom of the container. The action of the ejector 17 will create a sufficient suction through the pipe 20 to draw the liquid and any other loose matter in the container through the pipe 20 and discharge the same through the outlet pipe 21. It has been found in practice that the suction is sufficient not only to draw the liquid out of the container but will also draw out along with the liquid hardened greases and even relatively large pieces of metal which may have been broken from gears or otherwise found their way into the container. The liquid and the foreign matter which accompanies the same is discharged into the tank 1. The heavy substances which are withdrawn will settle to the bottom of the tank and such matter as may be held in suspension in or float on the liquid will be prevented from entering the pump by means of the screen 23, thus the liquid is caused to circulate from the pump through the container which is being cleaned, through the pipe 20 and ejector 17 back to the tank and pump. By this repeated use of the same liquid it is possible to clean a container by the use of a relatively small quantity of the liquid and, further, the same liquid can be used for cleaning a relatively large number of containers. It will be noted that the operating mechanism is all assembled on a base plate 3 and may be removed from the tank 1 as a unit and for this purpose we have attached to the base plate a handle or bail 26 by means of which the apparatus may be lifted.

While the operation above described contemplates the simultaneous injection of a stream of liquid into the container and the withdrawal of the liquid therefrom, it will be obvious that these two operations may be performed successively if desired. The stream of liquid may be forced through the nozzle irrespective of whether or not the suction conduit has been inserted in the container and the ejector will create the necessary suction in the suction conduit to withdraw the liquid when the valve discharge nozzle is closed as well as when it is open.

While we have shown and described one embodiment of our invention we wish it to be understood that we do not desire to be limited to the details thereof as various modifications may occur to a person skilled in the art.

Having now fully described our invention, what we claim as new and desire to secure by Letters Patent, is:

1. In an apparatus for cleaning containers and the like, a tank to contain a liquid, a pump having an inlet arranged within said tank, a structure comprising an inlet chamber communicating with the inlet of said pump and having a foraminous wall, a conduit connected with said pump and adapted to discharge a stream of liquid into a container which is to be cleaned, means for withdrawing the liquid from said container, and discharging the same against the foraminous wall of said inlet chamber, and means for operating said pump.

2. In an apparatus for cleaning containers and the like, a tank to contain a liquid, a pump supported within said tank and adapted to have its inlet immersed in the liquid therein, a conduit leading from said pump to the exterior of said tank, a flexible hose connected with said conduit and adapted to discharge a stream of liquid into a container which is to be cleaned, an ejector connected with said conduit, a second flexible hose connected with said ejector and adapted to extend into said container, a structure comprising an inlet chamber communicating with the inlet of said pump and having a foraminous wall extending above the level of the liquid in said tank, a conduit leading from said ejector into said tank and arranged to discharge against the foraminous wall of said inlet chamber, and means for operating said pump.

3. In an apparatus for cleaning containers and the like, a tank to contain a liquid, a supporting structure carried by said tank, a pump supported by said structure within said tank, a conduit supported by said structure and connected with the outlet of said pump, a discharge conduit connected with said outlet conduit and adapted to discharge a stream of liquid into a container which is to be cleaned, an ejector supported by said structure and connected with said outlet conduit, a casing supported by said pump communicating with the inlet thereof and having a foraminous wall, a conduit leading from said ejector into said tank and arranged to discharge against the foraminous wall of said casing, and means for operating said pump.

4. In an apparatus for cleaning containers and the like, a tank to contain a liquid, a supporting structure mounted on said tank and comprising a tubular member extending into said tank, a pump carried by said tubular member and having its outlet communicating therewith, said tubular member having a portion projecting above said supporting structure, a discharge conduit connected with the last mentioned portion of said tubular member and adapted to discharge a stream of liquid into a container which is to be cleaned, an ejector connected with said last mentioned portion of said tubular member, a second conduit connected with said ejector and adapted to extend into said container, a shaft carried by said supporting structure and operatively connected with said pump, and means for rotating said shaft.

5. In an apparatus for cleaning containers and the like, a tank to contain a liquid, a supporting structure mounted on said tank and comprising a tubular member extending into said tank, a pump carried by said tubular member and having its outlet communicating therewith, said tubular member having a portion projecting above said supporting structure, a discharge conduit connected with the last mentioned portion of said tubular member and adapted to discharge a stream of liquid into a container which is to be cleaned, an ejector connected with said last mentioned portion of said tubular member, a second conduit connected with said ejector and adapted to extend into said container, a casing carried by said pump, communicating with the inlet thereof and having a foraminous wall, a conduit leading from said ejector and arranged to discharge the liquid against said foraminous wall, a shaft carried by said supporting structure and operatively connected with said pump, and means for rotating said shaft.

6. In an apparatus for cleaning containers and the like, a tank to contain a liquid, a pump supported within said tank, a casing carried by said pump and having a foraminous wall provided with an inlet arranged in line with the inlet to said pump, a spring mounted within said casing and engaging said foraminous wall about said opening to press the same against said pump, an outlet conduit leading from said pump to the exterior of said tank, a conduit connected with said outlet conduit and adapted to discharge a stream of liquid into a container which is to be cleaned, an ejector connected with said outlet conduit, a conduit connected with said ejector and adapted to extend into said container, a second conduit leading from said ejector and arranged to discharge against the foraminous wall of said casing, and means for operating said pump.

7. A motor vehicle service station unit for cleaning gear casings and the like, comprising a tank for containing a cleaning fluid, a conduit adapted to communicate with the interior of the casing to be cleaned and with said tank, means for removing grease and the like from said casing through said conduit, and a strainer for separating solid matter from said grease, said strainer being so arranged that the material from said conduit will be discharged against the strainer for keeping the latter clean and the solid matter will be deposited at a point away from the strainer.

8. A motor vehicle service station unit for cleaning gear casings and the like, comprising a conduit adapted to communicate with the interior of the casing to be cleaned, a pump for removing grease and the like from said casing through said conduit, and a strainer for separating solid matter from said grease, said strainer being so arranged that the material from said conduit will be discharged against the strainer for keeping the latter clean and the solid matter will be deposited at a point away from the strainer.

9. A motor vehicle service station unit for cleaning gear casings and the like comprising a tank for containing a cleaning fluid and having a cover, a pump carried by said cover, and a conduit connected to said pump and adapted to communicate with the interior of the casing to be cleaned for removing grease and the like from said casing and discharging it into said tank.

10. A motor vehicle service station unit for cleaning gear casings and the like comprising a tank for containing a cleaning fluid and having a cover, a pump carried by said cover, a conduit connected to said pump and adapted to communicate with the interior of the casing to be cleaned for removing grease and the like from said casing and discharging it into said tank, and a strainer carried by the tank for separating solid matter from said grease.

11. A motor vehicle service station unit for cleaning gear casings and the like comprising a tank for containing a cleaning fluid and having a cover, a pump carried by said cover, a conduit connected to said pump and adapted to communicate with the interior of the casing to be cleaned for removing grease and the like from said casing and discharging it into said tank, a strainer carried by the tank for separating solid matter from said grease, and means for maintaining said strainer clean.

12. A motor vehicle service station unit for cleaning gear casings and the like comprising a tank for containing a cleaning fluid and having a cover, a pump carried by said cover, a conduit connected to said pump and adapted to comunicate with the interior of the casing to be cleaned for removing grease and the like from said casing and discharging it into said tank, a strainer carried by the tank for separating solid matter from said grease, and means whereby a fluid is directed against said strainer for maintaining the latter clean.

13. A motor vehicle service station unit for cleaning gear casings and the like comprising a tank, a conduit adapted to communicate with the interior of the casing to be cleaned, a pump carried by said tank for removing grease and the like from said casing through said conduit and delivering it into said tank, and a strainer carried by said tank for separating solid matter from said grease and preventing said solid matter from entering said pump, said strainer being arranged to cause the solid matter to be deposited at a point away from the strainer.

14. A motor vehicle service station unit for cleaning gear casings and the like comprising a tank, a conduit adapted to communicate with the interior of the casing to be cleaned, a pump carried by said tank for removing grease and the like from said casing through said conduit and delivering it into said tank, a strainer carried by said tank for separating solid matter from said grease and preventing said solid matter from entering said pump, said strainer being arranged to cause the solid matter to be deposited at a point away from the strainer and means whereby cleaning liquid may be supplied from said tank to the casing to be cleaned.

15. A motor vehicle service station unit for cleaning gear casings and the like comprising a tank, a conduit adapted to communicate with the interior of the casing to be cleaned, a pump carried by said tank for removing grease and the like from said casing through said conduit and delivering it into said tank, a strainer carried by said tank for separating solid matter from said grease and preventing said solid matter from entering said pump, and means for keeping said strainer clean and causing the solid matter to be deposited at a point away from said strainer.

16. A motor vehicle service station unit for cleaning gear casings and the like comprising a tank, a conduit adapted to communicate with the interior of the casing to be cleaned, a pump carried by said tank for removing grease and the like from said casing through said conduit and delivering it into said tank, a strainer carried by said tank for separating solid matter from said grease and preventing said solid matter from entering said pump, means whereby cleaning liquid may be supplied from said tank to the casing to be cleaned, and means for keeping said strainer clean and causing the solid matter to be deposited at a point away from said strainer.

17. A motor vehicle service station unit for cleaning gear casings and the like comprising a tank, a pump carried by said tank, a suction line and a pressure line connected to said pump for circulating a cleaning fluid through the casing to be cleaned, and means for selectively using either the suction line or pressure line.

18. A motor vehicle service station unit for cleaning gear casings and the like comprising a tank, a pump carried by said tank, a suction line and a pressure line connected to said pump for circulating a cleaning fluid through the casing to be cleaned, and means for selectively using either the suction line or pressure line or both.

19. A motor vehicle service station unit for cleaning gear casings and the like comprising a pump, a suction line and a pressure line connected to said pump for circulating a cleaning fluid through the casing to be cleaned, means for selectively using either the suction line or pressure line, and means for separating any solid matter removed from said casing with said cleaning fluid.

20. A motor vehicle service station unit for cleaning gear casings and the like comprising a pump, a suction line and a pressure line connected to said pump for circulating a cleaning fluid through the casing to be cleaned, means for selectively using either the suction line or pressure line, and a strainer for separating any solid matter removed from said casing with said cleaning fluid.

21. A motor vehicle service station unit for cleaning gear casings and the like comprising a pump, a suction line and a pressure line connected to said pump for circulating a cleaning fluid through the casing to be cleaned, means for selectively using either the suction line or pressure line, a strainer for separating any solid matter removed from said casing with said cleaning fluid, and means for keeping said strainer clean.

22. A motor vehicle service station unit for cleaning gear casings and the like comprising a pump, a fluid pressure line and a suction line operatively connected to said pump and the gear casing to be cleaned for circulating a cleaning fluid, and an ejector near the pump end of said suction line whereby only a portion of the cleaning fluid passing through said pump must be drawn through said suction line.

23. In an apparatus for cleaning gear casings and the like, a tank, a conduit leading from the casing to be cleaned to said tank, means to cause fluid to be withdrawn from said casing through said conduit, a casing arranged within said tank and having a foraminous wall, and means for causing the fluid from said conduit to be discharged against said foraminous wall.

24. In an apparatus for cleaning gear casings and the like, a tank, a conduit leading from the casing to be cleaned to said tank, means to cause fluid to be withdrawn from said casing through said conduit, a casing arranged within said tank and having a foraminous wall, and means for causing fluid to be discharged against said foraminous wall to keep the same clean.

25. In an apparatus for cleaning gear casings and the like, a tank, a casing within said tank having a foraminous wall, a conduit to connect the casing to be cleaned with said tank, means for causing fluid to be withdrawn from said casing to be cleaned through said conduit and to be discharged against said foraminous wall, and a pump to withdraw from said tank the fluid which has passed through said foraminous wall.

26. A motor vehicle service station unit for cleaning gear casings and the like comprising the tank, means for delivering fluid from said tank to the casing to be cleaned, a conduit to connect the casing to be cleaned with said tank, an ejector connected with the discharge end of said conduit and communicating with said tank, and means for discharging fluid under pressure through said ejector, whereby only that portion of the fluid which is delivered to said casing will be drawn through said conduit.

27. A motor vehicle service station unit for cleaning gear casings and the like comprising the tank, means for delivering fluid from said tank to the casing to be cleaned, a conduit to connect the casing to be cleaned with said tank, an ejector connected with the discharge end of said conduit and communicating with said tank, and a pump connected with said tank and having an outlet leading to said ejector, whereby only that portion of the fluid which is delivered to said casing will be drawn through said conduit.

28. In an apparatus for cleaning gear casings and the like, a tank, a removable closure for said tank, a pump carried by said closure and having its inlet immersed in the fluid in said tank, a screen carried by said closure and interposed between said inlet and the fluid in said tank, a conduit connected with said pump to discharge fluid into the casing to be cleaned, a second conduit to communicate with the interior of said casing, and means controlled by said pump to cause fluid to be drawn from said casing through said second conduit and delivered to said tank 29. In an apparatus for cleaning gear casings and the like, a tank, a removable closure for said tank, a pump carried by said closure and having its inlet immersed in the fluid in said tank, a screen carried by said closure and interposed between said inlet and the fluid in said tank, a conduit connected with said pump to discharge fluid into the casing to be cleaned, a second conduit to communicate with the interior of said casing, an ejector carried by said closure, connected with said second conduit and arranged to discharge into said tank, and a connection between said pump and said ejector.

30. In an apparatus for cleaning gear casings and the like, a tank, a removable closure for said tank, a tubular member carried by and depending from said closure, a pump connected with the lower end of said tubular member and discharging through the same, a conduit to connect the upper end of said tubular member with the casing to be cleaned, an ejector communicating with the upper end of said tubular member and arranged to discharge into said tank, and a conduit to connect said ejector with the casing to be cleaned.

31. In an apparatus for cleaning gear casings and the like, a tank, a removable closure for said tank, a tubular member carried by and depending from said closure, a pump connected with the lower end of said tubular member and discharging through the same, a conduit to connect the upper end of said tubular member with the casing to be cleaned, an ejector communicating with the upper end of said tubular member and arranged to discharge into said tank, a conduit to connect said ejector with the casing to be cleaned, and a screen interposed between the inlet of said pump and the fluid in said tank and arranged in the path of the fluid discharged from said ejector.

32. A motor vehicle service station unit for cleaning gear casings and the like, comprising a tank to contain a cleaning fluid and constituting a support for other parts of said unit, a pump carried by said tank and communicating with the interior thereof, a conduit connected with said pump and adapted to discharge into a casing which is to be cleaned, a second conduit adapted to communicate with said casing and to discharge into said tank, means controlled by said pump to remove cleaning fluid and grease from said casing through said second conduit, and means for separating grease and solid matter from the fluid discharged from said second conduit.

33. A motor vehicle service station unit for cleaning gear casings and the like, comprising a tank, a pump carried by said tank, a conduit adapted to communicate with the interior of the casing to be cleaned and to discharge into said tank, and means controlled by said pump for causing grease and the like to be removed from said casing through said conduit and discharged into said tank.

In testimony whereof. We affix our signatures hereto.

LEO DEUTSCH.
FERDINAND A. PFEIFER.